United States Patent
Yoshikawa et al.

(10) Patent No.: US 12,448,343 B2
(45) Date of Patent: Oct. 21, 2025

(54) METHOD FOR PURIFYING (HYDRO)HALOCARBON BY REDUCED PRESSURE DISTILLATION FROM AZEOTROPIC OR AZEOTROPIC-LIKE COMPOSITION

(71) Applicant: Central Glass Company, Limited, Ube (JP)

(72) Inventors: Satoshi Yoshikawa, Kawagoe (JP); Hideaki Imura, Kawagoe (JP); Naoki Nishinaka, Kawagoe (JP)

(73) Assignee: Central Glass Company, Limited, Ube (JP)

( * ) Notice: Subject to any disclaimer, the term of this patent is extended or adjusted under 35 U.S.C. 154(b) by 571 days.

(21) Appl. No.: 17/946,707

(22) Filed: Sep. 16, 2022

(65) Prior Publication Data
US 2023/0063030 A1 Mar. 2, 2023

Related U.S. Application Data

(63) Continuation of application No. PCT/JP2021/010095, filed on Mar. 12, 2021.

(30) Foreign Application Priority Data

Mar. 19, 2020 (JP) ................................ 2020-049264
Oct. 15, 2020 (JP) ................................ 2020-173710

(51) Int. Cl.
C07C 17/386 (2006.01)
C07C 29/82 (2006.01)
C07C 41/58 (2006.01)

(52) U.S. Cl.
CPC ............ *C07C 17/386* (2013.01); *C07C 29/82* (2013.01); *C07C 41/58* (2013.01)

(58) Field of Classification Search
CPC ..... C07C 17/383; C07C 17/386; C07C 41/42; C07C 29/82
See application file for complete search history.

(56) References Cited

U.S. PATENT DOCUMENTS

| | | | |
|---|---|---|---|
| 5,918,481 A | 7/1999 | Pham et al. | |
| 6,469,219 B1 | 10/2002 | Khrimian et al. | |
| 2008/0058560 A1 | 3/2008 | Massell et al. | |
| 2011/0101264 A1 | 5/2011 | Knapp | |
| 2015/0011805 A1 | 1/2015 | Okamoto et al. | |
| 2015/0099907 A1 | 4/2015 | Imura et al. | |
| 2015/0191405 A1 | 7/2015 | Nishiguchi et al. | |
| 2020/0010392 A1* | 1/2020 | Miller | C07C 17/386 |

FOREIGN PATENT DOCUMENTS

| | | |
|---|---|---|
| CN | 1636864 A | 7/2005 |
| CN | 102666453 A | 9/2012 |
| CN | 105566074 A | 5/2016 |
| EP | 3 202 882 A1 | 8/2017 |
| JP | 2001-524461 A | 12/2001 |
| JP | 2003-530323 A | 10/2003 |
| JP | 2007-520561 A | 7/2007 |
| JP | 2013-509409 A | 3/2013 |
| JP | 2013-103890 A | 5/2013 |
| WO | WO 99/26908 A1 | 6/1999 |
| WO | WO 2010/088196 A2 | 8/2010 |
| WO | WO 2011/053449 A1 | 5/2011 |
| WO | WO 2012/009411 A1 | 1/2012 |
| WO | WO 2013/187489 A1 | 12/2013 |
| WO | WO 2014/046251 A1 | 3/2014 |
| WO | WO 2018/118625 A1 | 6/2018 |
| WO | WO 2020/022474 A1 | 1/2020 |

OTHER PUBLICATIONS

International Search Report (PCT/ISA/210) issued in PCT Application No. PCT/JP2021/010095 dated May 11, 2021 with English translation (seven (7) pages).
Japanese-language Written Opinion (PCT/ISA/237) issued in PCT Application No. PCT/JP2021/010095 dated May 11, 2021 (five (5) pages).
English translation of document C2 (Japanese-language Written Opinion (PCT/ISA/237), filed on Sep. 16, 2022) issued in PCT Application No. PCT/JP2021/010095 dated May 11, 2021 (four (4) pages).
Japanese-language Office Action issued in Japanese Application No. 2022-508318 dated Jan. 7, 2025 with English translation (8 Pages).
Extended European Search Report issued in European Application No. 21772318.8 dated Apr. 4, 2024 (11 pages).
Chinese-language Office Action issued in Chinese Application No. 202180008039.6 dated Jan. 24, 2024 with English translation (11 Pages).

* cited by examiner

*Primary Examiner* — Medhanit W Bahta
(74) *Attorney, Agent, or Firm* — Crowell & Moring LLP

(57) ABSTRACT

According to an embodiment, a method for producing a (hydro)halocarbon includes a step of purifying the (hydro)halocarbon by reduced-pressure distillation of an azeotropic or azeotropic-like composition containing the (hydro)halocarbon and a compound different from the (hydro)halocarbon. According to another embodiment, a method for producing a (hydro)halocarbon includes a step purifying the (hydro)halocarbon by reduced-pressure distillation of an azeotropic or azeotropic-like composition containing the (hydro)halocarbon and a compound different from the (hydro)halocarbon, wherein standard boiling points of both the (hydro)halocarbon and the compound are 80° C. or lower.

9 Claims, No Drawings

METHOD FOR PURIFYING (HYDRO)HALOCARBON BY REDUCED PRESSURE DISTILLATION FROM AZEOTROPIC OR AZEOTROPIC-LIKE COMPOSITION

CROSS-REFERENCE TO RELATED APPLICATIONS

This application is a Continuation of International Patent Application No. PCT/JP2021/010095, filed on Mar. 12, 2021, which claims the benefit of priority to Japanese Patent Application No. 2020-049264, filed on Mar. 19, 2020, and Japanese Patent Application No. 2020-173710, filed on Oct. 15, 2020, the entire contents of which are incorporated herein by reference.

FIELD

The present invention relates to a method for producing (hydro)halocarbon.

BACKGROUND

Unsaturated chlorofluorocarbons with double bonds in a molecule, such as 1-chloro-3,3,3-trifluoropropene (hereinafter, also referred to as HCFO-1233zd, 1233zd), are a compound having both low ozone depleting potential and low global warming potential because of their low boiling point and very short atmospheric lifetime. Therefore, unsaturated chlorofluorocarbons such as HCFO-1233zd are expected as one of compounds available for cleaning agent, refrigerants, and the like.

For example, Z-1-chloro-3,3,3-trifluoropropene (hereinafter, also referred to as HCFO-1233zd(Z), 1233zd(Z)) which is one of unsaturated chlorofluorocarbons can be produced by fluorination 1,1,1,3,3-pentachloropropane (hereinafter, also referred to as HCC-240fa, 240fa) with hydrogen fluoride. In fluorination of HCC-240fa, a reaction product containing unreacted hydrogen fluoride and by-products such as E-1-chloro-3,3,3-trifluoropropene (hereinafter also referred to as HCFO-1233zd(E), 1233zd(E)), which is a geometric isomer, 3-chloro-1,1,1,3-tetrafluoropropane (hereinafter also referred to as HCFC-244fa, 244fa), and 2-chloro-1,1,1,3,3-pentafluoropropane (hereinafter also referred to as HCFC-235da, 235da) are obtained together with HCFO-1233zd(Z) (see Japanese laid-open patent publication No. 2013-103890). Since HCFC-244fa and HCFC-235da form an azeotropic-like composition with HCFO-1233zd(Z), which is a target substance, it is difficult to purify high-purity HCFO-1233zd(Z) from the reaction product.

SUMMARY

One of the problems of the present invention is to provide a method for producing high-purity (hydro)halocarbon from an azeotropic or azeotropic-like composition containing (hydro)halocarbon and a compound different from the (hydro)halocarbon.

According to an embodiment of the present invention, there is provided a method for producing a (hydro)halocarbon including a step of purifying the (hydro)halocarbon by reduced-pressure distillation of an azeotropic or azeotropic-like composition containing the (hydro)halocarbon and a compound different from the (hydro)halocarbon.

A column top pressure of a distillation column may be 50 kPa or less in the reduced-pressure distillation.

A column top temperature of the distillation column may be 20° C. or lower in the reduced-pressure distillation.

Standard boiling points of both the (hydro)halocarbon and the compound may be 120° C. or lower.

The standard boiling points of both the (hydro)halocarbon and the compound may be 80° C. or lower.

The (hydro)halocarbon may be a compound represented by a general formula (1) $C_mH_aF_bCl_c$ (m is an integer from 2 to 5, a, b, and c are integers of 0 or more, satisfying $b+c \geq 1$, and $a+b+c=2m-2, 2m,$ or $2m+2$), and the compound may be at least one selected from hydrogen fluoride and a compound represented by the general formula (1) (except for the compound selected as the (hydro)halocarbon).

The (hydro)halocarbon may be a compound represented by a general formula (2) $C_nH_dFeCl_fO_g$ (n is an integer from 3 to 5, d, e, and f are integers from 0 or more, and g is an integer greater than or equal to 1, and satisfying $e+f \geq 1$, and $d+e+f=2n-2, 2n,$ or $2n+2$), the compound may be at least one selected from hydrogen fluoride and a compound represented by the general formula (2) (except for the compound selected as the (hydro)halocarbon).

The (hydro)halocarbon may be cis-1-chloro-3,3,3-trifluoropropene, and the compound may be 3-chloro-1,1,1,3-tetrafluoropropane.

The (hydro)halocarbon may be cis-1,2-dichloro-3,3,3-trifluoropropene, and the compound may be 1,1-dichloro-3,3,3-trifluoropropene.

The (hydro)halocarbon may be cis-1,2-dichloro-3,3-difluoropropene, and the compound may be trans-1,2-dichloro-3,3-difluoropropene.

According to another embodiment of the present invention, there is provided a method for producing a (hydro)halocarbon including a step of purifying the (hydro)halocarbon by reduced-pressure distillation of an azeotropic or azeotropic-like composition containing the (hydro)halocarbon and a compound different from the (hydro)halocarbon, wherein standard boiling points of both the (hydro)halocarbon and the compound are 80° C. or lower.

According to another embodiment of the present invention, there is provided a method for producing high-purity cis-1-chloro-3,3,3-trifluoropropene including a step of recovering a fraction containing cis-1-chloro-3,3,3-trifluoropropene as a major component by reduced-pressure distillation of an azeotropic or azeotropic-like composition containing cis-1-chloro-3,3,3-trifluoropropene and saturated hydrohalocarbon containing at least 3-chloro-1,1,1,3-tetrafluoropropane, a step of purifying cis-1-chloro-3,3,3-trifluoropropene by contacting the fraction with a base, and a step of obtaining high-purity cis-1-chloro-3,3,3-trifluoropropene with a content of 3% or less by mass of 3-chloro-1,1,1,3-tetrafluoropropane by further reduced-pressure distillation of the fraction.

The method for producing cis-1-chloro-3,3,3-trifluoropropene may further include a step of purifying cis-1-chloro-3,3,3-trifluoropropene by contacting the fraction with a base after the step of recovering the fraction and before the step of obtaining cis-1-chloro-3,3,3-trifluoropropene.

The step of purifying the 1-chloro-3,3,3-trifluoropropene may be a step of dehydrohalogenation of 3-chloro-1,1,1,3-tetrafluoropropane contained in the fraction.

According to an embodiment of the present invention, high-purity (hydro)halocarbon can be obtained from an azeotropic or azeotropic-like composition containing (hydro)halocarbon and a compound different from the (hydro)halocarbon.

DESCRIPTION OF EMBODIMENTS

Embodiments of the present invention will be described below. However, the present invention can be implemented in various modes without departing from the gist thereof and should not be construed as being limited to the description of the following exemplary embodiments. In addition, it is to be understood that other operational effects different from those provided by the embodiments described below, or those which can be easily predicted by those skilled in the art, are naturally brought about by the present invention.

[Azeotropic-Like Composition]

An azeotropic composition is characterized in that a boiling point of a liquid composition is fixed under a predetermined pressure, and the composition of a vapor (vapor phase) of the liquid composition during boiling is the same as that of the liquid composition (liquid phase) during boiling. That is, the azeotropic composition does not cause fractionation of components of the liquid composition upon boiling of the liquid composition. On the other hand, an azeotropic-like composition refers to a composition that behaves similarly to the azeotropic composition, characterized in that a boiling point of the liquid composition is substantially fixed under a predetermined pressure, and that a composition of the vapor (vapor phase) of the liquid composition during boiling changes only negligibly with respect to a composition of the liquid composition (liquid phase) during boiling because it volatilizes at substantially the same composition as the composition of the liquid when the liquid composition volatilizes. That is, in the azeotropic-like composition, fractionation of components of the liquid composition hardly occurs upon boiling of the liquid composition. On the other hand, a non-azeotropic composition which is not azeotropic-like is characterized in that the composition of the vapor phase of the composition and the composition of liquid phase of the composition change during evaporation or condensation.

Hereinafter, a method for producing (hydro)halocarbon (hereinafter, referred to as a present production method) according to the present embodiment will be described. In the present production method, (hydro)halocarbon can be selectively produced from an azeotropic or azeotropic-like composition containing (hydro)halocarbon and impurities.

(Hydro)halocarbon is a compound containing at least a carbon atom and a halogen atom in a molecule. The (hydro)halocarbon may further contain a hydrogen atom and/or an oxygen atom. In an embodiment, the (hydro)halocarbon is a compound represented by a general formula (1): $C_mH_aF_bCl_c$. In the general formula (1), m is an integer from 2 to 5, a, b, and c are integers greater than or equal to 0, and satisfying $b+c\geq1$, and $a+b+c=2m-2$, $2m$, or $2m+2$. The compound represented by the general formula (1) can be produced, for example, by halogenation (e.g., fluorination, chlorination) of an industrially produced saturated hydrocarbon compound or unsaturated hydrocarbon compound or dehalogenation (e.g., dehydrofluorination, dehydrochlorination) of an industrially produced halogenated saturated hydrocarbon compound or halogenated unsaturated hydrocarbon compound. In addition, in another embodiment, the (hydro)halocarbon is a compound represented by the general formula (2): $C_nH_dFeCl_fO_g$. In the general formula (2), n is an integer from 3 to 5, d, e, and f are 0.7 integers greater than or equal to 0, g is an integer greater than or equal to 1, and satisfying $e+f\geq1$, and $d+e+f=2n-2$, $2n$, or $2n+2$. The compound represented by the general formula (2) can be produced, for example, by hydroxylation of an industrially produced halogenated saturated hydrocarbon compound or halogenated unsaturated hydrocarbon compound, or by alkylation of an industrially produced halogenated saturated/unsaturated ether.

In these reactions, a by-product may be produced together with a target (hydro)halocarbon. In the case where the by-product forms an azeotropic or azeotropic-like composition with the target (hydro)halocarbon, the purity of the target (hydro)halocarbon of interest is reduced. In addition, unreacted raw materials (e.g., hydrogen fluoride used for halogenation) may remain in these reactions. This residual hydrogen fluoride is also one of the factors that decrease the purity of the target (hydro)halocarbon.

The present inventor has completed the present invention by reduced-pressure distilling an azeotropic or azeotropic-like composition containing a target (hydro)halocarbon and a compound different from the target (hydro)halocarbon to obtain the target (hydro)halocarbon with high-purity.

Hereinafter, a production method according to an embodiment of the present invention (hereinafter, referred to as a present production method) will be described. The present production method includes a step of purifying a target (hydro)halocarbon by reduced-pressure distillation of an azeotropic or azeotropic-like composition containing the target (hydro)halocarbon and a compound different from the (hydro)halocarbon. In this case, the compound different from the (hydro)halocarbon is a compound containing at least a carbon atom and a halogen atom in a molecule, which is not the same compound as the target (hydro)halocarbon. The compound different from the (hydro)halocarbon may contain a hydrogen atom in addition to a carbon atom and a halogen atom in a molecule. The compound different from the (hydro)halocarbon may be at least one selected from hydrogen fluoride and a compound represented by the above general formula (1) (except for a compound selected as the (hydro)halocarbon). In addition, the compound different from the (hydro)halocarbon may be at least one selected from hydrogen fluoride and a compound represented by the above general formula (2) (except for a compound selected as the (hydro)halocarbon).

First Embodiment

[Production Method]

A method for producing cis-1-chloro-3,3,3-trifluoropropene (1233zd(Z)) will be described as an example of the present production method.

1233zd can be obtained according to the following scheme by reacting 1,1,1,3,3-pentachloropropane (240fa) with hydrogen fluoride.

[Scheme 1]

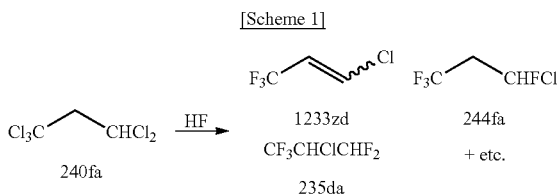

In the composition obtained by fluorination reaction of 240fa, depending on the reaction conditions, cis-1-chloro-3,3,3-trifluoropropene (1233zd(Z)) and trans-1-chloro-3,3,3-trifluoropropene (1233zd(E)) are usually contained in a predetermined ratio. In this reaction, not only 1233zd as a major component but also other halides as by-products may be produced. Depending on the reaction conditions, for example, 3-chloro-1,1,1,3-tetrafluoropropane (244fa), 2-chloro-1,1,1,3,3-pentafluoropropane (235da), and the like are by-produced as halides. 244fa and 235da exhibit azeotropic or azeotropic-like behavior with 1233zd(Z).

[Purification Process]

The composition obtained by fluorination reaction of 240fa is purified to obtain the 1233zd(Z), which is a target substance, with high purity. In the present production method, high-purity 1233zd(Z) is obtained from a composition containing an azeotropic-like composition of 1233zd (Z) and 244fa by reduced-pressure distillation.

Although it is only necessary for a distillation column that can be used for reduced-pressure distillation to have a function necessary for ordinary reduced-pressure distillation, it is preferred to use a rectification column such as a plate column or a packed column. Although a theoretical plate number of the distillation column is usually 10 to 60 stages, preferably 20 to 50 stages, it is not limited to these ranges.

The pressure in the system in a reduced-pressure distillation step may be set to 50 kPa or less and is preferred to be set to 1 kPa to 30 kPa from the viewpoint of industrial practicality. In particular, in the reduced-pressure distillation, a column top pressure of a distillation column used is preferably 20 kPa or less, more preferably 10 kPa or less.

Although a column top liquid temperature in the reduced-pressure distillation step is not particularly limited, it is preferred to be set to +20° C. or lower, particularly +10° C. or lower and −20° C. or higher from the viewpoint of industrial practicality. If the column top liquid temperature is −20° C. or higher, it is easy to adopt it industrially because an increase in equipment cost such as enlargement of a cooler can be avoided. In addition, if the column top liquid temperature is +20° C. or lower, the distillation separation efficiency is good. In an embodiment, the column top liquid temperature in the reduced-pressure distillation step is preferred to be set to −20° C. or higher and +20° C. or lower, and particularly preferred to be set to −20° C. or higher and +10° C. or lower.

Also, in the purification process, the reduced-pressure distillation may be performed a plurality of times. In the case where the reduced-pressure distillation is performed twice or more, the same distillation column may be used a plurality of times, and a plurality of distillation columns may be used.

High purity 1233zd(Z) can be obtained from a composition containing an azeotropic-like composition including 1233zd(Z) and 244fa by two or more times of reduced-pressure distillation. In this case, the high-purity 1233zd(Z) means 1233zd(Z) in which the content of 244fa, for the total amount of 1233zd(Z) and 244fa, is 3% by mass or less, preferably 1% by mass or less, more preferably 0.5% by mass, and particularly preferably 0.3% by mass.

In the case where the reduced-pressure distillation is performed twice or more, the reduced-pressure distillation step may be performed continuously, and another step may be sandwiched between the two times or more distillation steps. For example, after at least one reduced-pressure distillation, a dehydrohalogenation process step may be performed before the next reduced-pressure distillation is performed. Specifically, after at least one reduced-pressure distillation, a fraction containing 1233zd(Z) as a major component (e.g., a fraction containing 1233zd(Z) in an amount of 30% by weight or more, 50% by weight or more, 70% by weight or more, 80% by weight or more, 90% by weight or more, or 95% by weight or more) is recovered, and a base is added to the recovered fraction, whereby 244fa and 235da remaining in the fraction are dehydrohalogenated.

High purity 1233zd(Z) can be obtained by reduced-pressure distillation of the fraction again after the dehydrohalogenation process.

When the dehydrohalogenation process step is performed, it is preferred to add a compatibilizing agent that makes the fraction containing 1233zd(Z) compatible with a basic aqueous solution. By coexisting with the compatibilizing agent, the reaction of the base with 1233zd(Z) can be suppressed, and 244fa and 235da remaining in the fraction can be decomposed. 244fa is converted to a corresponding fluorine-containing olefin (1234ze) by a dehydrochlorination reaction in the dehydrohalogenation process step. 235da is converted to a corresponding fluorine-containing olefin (1224xe) by a dehydrofluorination reaction in the dehydrohalogenation process step. Since the boiling point of these fluorine-containing olefins produced in the dehydrohalogenation process step is sufficiently different from that of 1233zd(Z), it can be easily separated from 1233zd(Z) by distillation.

The base used in the dehydrohalogenation is not particularly limited, and examples thereof include inorganic bases such as hydroxides, carbonates, phosphates, alkoxides, oxides, and hydrides of alkali metals or alkaline earth metals. Alkali metals include, for example, sodium, potassium, and lithium. Alkaline earth metals include, for example, calcium and magnesium. Specific examples of inorganic base include sodium hydroxide, sodium carbonate, sodium phosphate, sodium oxide, sodium hydride, potassium hydroxide, potassium carbonate, potassium phosphate, potassium oxide, potassium hydride, lithium hydroxide, calcium hydroxide, calcium oxide, and magnesium hydroxide. Sodium hydroxide, sodium carbonate, potassium hydroxide, and potassium carbonate are preferable, and sodium hydroxide having good availability is the most preferable as the inorganic base. One kind of these bases may be used alone, or two or more kinds thereof may be used in combination.

The amount of base in the basic aqueous solution depends on the amount of 244fa and 235da in the fraction. With respect to 1 mol of 235da and/or 244fa, the amount of inorganic base is preferably 1.5 to 4 mol equivalent ("equivalent" denote chemical equivalent), particularly preferably 2 to 3 mol equivalent.

The compatibilizing agent assists in the compatibility of 1233zd(Z) and the inorganic base aqueous solution in the fraction. A phase transfer catalyst or a water-soluble organic substance such as an alcohol or a ketone is preferable as the compatibilizing agent.

Examples of the phase transfer catalyst include quaternary ammonium compounds such as ammonium fluoride, ammonium chloride, ammonium bromide, ammonium iodide, and ammonium hydroxide, crown ethers, calixarenes, cyclophanes, cyclodextrins, phosphonium compounds, and pyridinium compounds. Specifically, examples thereof include tetrabutylammonium fluoride, benzyldimethylalkylammonium chloride, 1-butyl-1-methylpyrrolidinium chloride, phenyltriethylammonium chloride, 1-butyl-1-methylpiperidinium bromide, trimethyl-3-trifluoromethylphenylammonium bromide, trimethyl-α,α,α-trifluoro-m-tolylammonium hydroxide, hexadecyltrimethylammonium hydroxide, trimethylphenylammonium iodide, 2,3-benzo-1,4,7,10-tetraoxadodec-2-ene, 24-crown 8-ether, triphenyl(2-chlorobenzyl)phosphonium chloride, and 4-(dimethylamino)-1-(triphenylmethyl)pyridinium chloride.

A compound that completely mixes with water at ordinary temperature can be used as the water-soluble organic substance. Examples of the water-soluble organic substance include alcohols, polyalcohols, amides, ketones, ethers, polyethers, and cyclic ethers. In consideration of the availability, treatment of waste solution, and the like, alcohols are preferable as the water-soluble organic substance.

Although the alcohol as the compatibilizing agent is not particularly limited, alcohol having 1 to 4 carbon atoms is preferred. Specifically, a single product or a mixture of general-purpose alcohols such as methanol, ethanol, isopropanol, normal propanol, n-butanol, s-butanol, and t-butanol is preferred, and methanol and ethanol are particularly preferred. The amount of the alcohol added is preferably 5 to 40% by mass, particularly preferably 10 to 30% by mass, based on the fraction.

Second Embodiment

[Production Method]

A method for producing cis-1,2-dichloro-3,3,3-trifluoropropene (also referred to as HCFO-1223xd(Z), 1223xd(Z)) will be described as an example of the present production method.

1223xd(Z) can be produced by a dehydrochlorination reaction of 1,1,2-trichloro-3,3,3-trifluoropropane (also referred to as HCFC-233da, 233da). In a composition obtained by this reaction, depending on the reaction conditions, 1223xd(Z) and E-1,2-dichloro-3,3,3-trifluoropropene (also referred to as HCFO-1223xdE, 1223xd) are usually contained in a predetermined ratio. In addition, the composition may contain 1,1-dichloro-3,3,3-trifluoropropene (also referred to as HCFO-1223za, 1223za). 122€(E) and/or 1223za exhibits azeotropic or azeotropic-like behavior with 1223xd(Z).

[Purification Process]

The composition obtained by the dehydrochlorination reaction of 233da is purified to obtain 1223xd(Z), which is the target substance, with high purity. In the present production method, high-purity 1223xd(Z) is obtained from a composition containing an azeotropic-like composition including 1223xd(Z) and 1223xd(E) and/or 1223za by reduced-pressure distillation.

Although it is only necessary for a distillation column that can be used for reduced-pressure distillation to have a function necessary for ordinary reduced-pressure distillation, it is preferred to use a rectification column such as a plate column or a packed column. Although a theoretical plate number of the distillation column is usually 10 to 60 stages, preferably 20 to 50 stages, it is not limited to these ranges.

The pressure in the system in the reduced-pressure distillation step may be set to 50 kPa or less and is preferred to be set to 1 kPa to 20 kPa from the viewpoint of industrial practicality. In particular, in the reduced-pressure distillation, a column top pressure of a distillation column used is preferably 10 kPa or less, more preferably 5 kPa or less.

Although a column top liquid temperature in the reduced-pressure distillation step is not particularly limited, it is preferred to be set to +20° C. or lower and −20° C. or higher from the viewpoint of industrial practicality. If the column top liquid temperature is −20° C. or higher, it is easy to adopt it industrially because an increase in equipment cost such as enlargement of a cooler can be avoided. In addition, if the column top liquid temperature is +20° C. or lower, the distillation separation efficiency is good. In an embodiment, the column top liquid temperature in the reduced-pressure distillation step is preferred to be set to −20° C. or higher and +20° C. or lower.

Also in this embodiment, in the purification process, the reduced-pressure distillation may be performed a plurality of times. In the case where the reduced-pressure distillation is performed twice or more, the same distillation column may be used a plurality of times, and a plurality of distillation columns may be used.

High-purity 1223xd(Z) can be obtained from a composition containing an azeotropic-like composition including 1223xd(Z) and 1223xd(E) and/or 1223za by two or more times of reduced-pressure distillation. In this case, the high-purity 1223xd(Z) means 1223xd(Z) in which the content of 1223xd(E) and/or 1223za, for the total amount of 1223xd(Z) and 1223xd(E) and/or 1223za, is 3% by mass or less, preferably 1% by mass or less, more preferably 0.5% by mass, and particularly preferably 0.3% by mass.

In addition, in the case where the reduced-pressure distillation is performed twice or more, the distillation step may be performed continuously, and another step such as the dehydrohalogenation process step of impurities may be sandwiched between the two times or more distillation steps. Details of the dehydrohalogenation process step are the same as those of the first embodiment described above, and therefore, a description thereof will be omitted. In addition, in the case where the dehydrohalogenation process step is performed, it is preferred to add a compatibilizing agent that makes the fraction containing 1223xd(Z) compatible with the basic aqueous solution in the same manner as in the first embodiment. The base and compatibilizing agent used in the dehydrohalogenation is the same as the base and compatibilizing agent used in the dehydrohalogenation described in the first embodiment. This can selectively suppress the reaction of the base with 1223xd(Z) and decompose the remaining 1223xd(E) and/or 1223za in the fraction. For example, 1223xd(E) and 1223za are converted to 1-chloro-3,3,3-trifluoropropyne and 3,3,3-trifluoropropionic acid.

Third Embodiment

[Production Method]

A method for producing cis-1,2-dichloro-3,3-difluoropropene (hereinafter, also referred to as HCFO-1232xd(Z), 1232xd(Z)) will be described as an example of the present production method.

1232xd(Z) can be produced by reacting 1,2,3,3-tetrachloropropene (also referred to as HCO-1230xd, 1230xd) with hydrogen fluoride. In a composition obtained by this reaction, depending on the reaction conditions, 1232xd(Z) and trans-1,2-dichloro-3,3-difluoropropene (hereinafter, also referred to as HCFO-1232xd(E), 1232xd(E)) are usually contained in a predetermined ratio. 1232xd(E) exhibits azeotropic or azeotropic-like behavior with 1232xd(Z).

[Purification Process]

The composition obtained by the fluorination reaction of HCO-1230xd is purified to obtain 1232xd(Z), which is the target substance, with high purity. In the present production method, high-purity 1232xd(Z) is obtained from a composition containing an azeotropic-like composition including 1232xd(Z) and 1232xd(E) by reduced-pressure distillation.

Although it is only necessary for a distillation column that can be used for reduced-pressure distillation to have a function necessary for ordinary reduced-pressure distillation, it is preferred to use a rectification column such as a plate column or a packed column. Although a theoretical plate number of the distillation column is usually 10 to 60 stages, preferably 20 to 50 stages, it is not limited to these ranges.

The pressure in the system in the reduced-pressure distillation step may be set to 50 kPa or less and is preferred to be set to 1 kPa to 20 kPa from the viewpoint of industrial practicality. In particular, in the reduced-pressure distillation, a column top pressure of a distillation column used is preferably 10 kPa or less, more preferably 5 kPa or less.

Although a column top liquid temperature in the reduced-pressure distillation step is not particularly limited, it is preferred to be set to +20° C. or lower and −20° C. or higher from the viewpoint of industrial practicality. If the column top liquid temperature is −20° C. or higher, it is easy to adopt it industrially because an increase in equipment cost such as enlargement of a cooler can be avoided. In addition, if the column top liquid temperature is +20° C. or lower, the distillation separation efficiency is good. In an embodiment, the column top liquid temperature in the reduced-pressure distillation step is preferred to be set to −20° C. or higher and +20° C. or lower.

Also in this embodiment, in the purification process, the reduced-pressure distillation may be performed a plurality of times. In the case where the reduced-pressure distillation is performed twice or more, the same distillation column may be used a plurality of times, and a plurality of distillation columns may be used.

High-purity 1232xd(Z) can be obtained from a composition containing an azeotropic-like composition including 1232xd(Z) and 1232xd(E) by two or more times of reduced-pressure distillation. In this case, the high-purity 1232xd(Z) means 1232xd(Z) in which the content of 1232xd(E), for the total amount of 1232xd(Z) and 1232xd(E), is 3% by mass or less, preferably 1% by mass or less, more preferably 0.5% by mass, and particularly preferably 0.3% by mass.

In addition, in the case where the reduced-pressure distillation is performed twice or more, the distillation step may be performed continuously, and another step such as the dehydrohalogenation process step of impurities may be sandwiched between the two or more distillation steps. Details of the dehydrohalogenation process step are the same as those of the first embodiment described above, and therefore, a description thereof will be omitted.

[Modification]

A method of recovering a trans-1-chloro-3,3,3-trifluoropropene (1233zd(E)) will be described as a modification of the present production method.

1,1,1,3,3-pentafluoropropane (also referred to as HFC-245fa, 245fa) is obtained by fluorinating 1233zd(E). In a composition obtained by fluorination of 1233zd(E), depending on the reaction conditions, 1,1,1,3,3-pentafluoropropane (245fa) and unreacted 1233zd(E) may be contained in a predetermined ratio. 245fa exhibits azeotropic or azeotropic-like behavior with 1233zd(E). If unreacted 1233zd(E) can be recovered from the obtained composition, the recovered 1233zd(E) can be used again as a raw material of 245fa.

[Purification Process]

The composition obtained by the fluorination reaction of 1233zd(E) is purified to obtain 245fa or 1233zd(E) with high purity. In the present purification method, high-purity 1233zd(E) can be obtained from a composition containing an azeotropic-like composition including 1233zd(E) and 245fa by reduced-pressure distillation.

Although it is only necessary for a distillation column that can be used for reduced-pressure distillation to have a function necessary for ordinary reduced-pressure distillation, it is preferred to use a rectification column such as a plate column or a packed column. Although a theoretical plate number of the distillation column is usually 10 to 60 stages, preferably 20 to 50 stages, it is not limited to these ranges.

The pressure in the system in the reduced-pressure distillation step may be set to 50 kPa or less and is preferred to be set to 1 kPa to 50 kPa from the viewpoint of industrial practicality. In particular, in the reduced-pressure distillation, a column top pressure of a distillation column used is preferably 40 kPa or less, more preferably 30 kPa or less.

Although a column top liquid temperature in the reduced-pressure distillation step is not particularly limited, it is preferred to be set to +20° C. or lower and −20° C. or higher from the viewpoint of industrial practicality. If the column top liquid temperature is −20° C. or higher, it is easy to adopt it industrially because an increase in equipment cost such as enlargement of a cooler can be avoided. In addition, if the column top liquid temperature is +20° C. or lower, the distillation separation efficiency is good. The column top liquid temperature in the reduced-pressure distillation step is preferred to be set to −20° C. or higher and +20° C. or lower.

In the purification process, as in the first embodiment to the third embodiment described above, the reduced-pressure distillation may be performed a plurality of times. In addition, in the case where the reduced-pressure distillation is performed twice or more, the distillation step may be performed continuously, and another step such as the dehydrohalogenation process step of impurities as described above may be sandwiched between the two or more distillation steps.

In the production method according to the first embodiment to the third embodiment described above and the purification method as a modification, from the viewpoint of being separable from each other by the reduced-pressure distillation, both the (hydro)halocarbon contained in the composition and the impurities contained together with the (hydro)halocarbon are preferred to have standard boiling point of 120° C. or lower, and further preferred to have standard boiling point of 80° C. or lower.

According to the production method according to the first embodiment to the third embodiment described above, in the case where hydrogen fluoride or water remains in the composition, the (hydro)halocarbon can also be separated from hydrogen fluoride or water by the reduced-pressure distillation of the composition.

In the above description, although 1233zd(Z), 1223xd(Z), 1232xd(Z), and 1233zd(E) have been described as examples of (hydro)halocarbon, and 244fa, 1223za, 1223xd(E), 1232xd(E), and 245fa have been described as examples of the impurities constituting an azeotropic-like composition with the (hydro)halocarbon, (hydro)halocarbon and the impurities exhibiting azeotropic or azeotropic-like behavior with the (hydro)halocarbon are not limited thereto.

In an embodiment, the (hydro)halocarbon included in the composition and separable from the composition by reduced-pressure distillation includes a compound represented by the general formula (1): $C_mH_aF_bCl_c$. In the general formula (1), m is an integer from 2 to 5, a, b, and c are integers greater than or equal to 0, satisfying $b+c \geq 1$, and a+b+c=2m-2, 2m, or 2m+2.

Table 1 and Table 2 below show a combination of (hydro)halocarbon contained in a composition and represented by the general formula (1) and a compound that exhibits an azeotropic or azeotropic-like behavior with the (hydro)halocarbon at atmospheric pressure and is different from the (hydro)halocarbon. However, the (hydro)halocarbon and the compound different from the (hydro)halocarbon are not limited thereto.

TABLE 1

| (hydro)halocarbon | Composition exhibiting azeotropic-like behavior with (hydro)halocarbon |
|---|---|
| HCFO-1233zd(E) (E-1-chloro-3,3-trifluoropropene) | HCFO-1233xf (2-chloro-3,3,3-trifluoropropene) HCFO-1224zb(Z) Z-1-chloro-1,3.3,3-tetrafluoropropene) HCFO-1224xe (2-chloro-1,3,3,3-tetrafluoropropene) HFC-245fa (1,1,1,3,3-pentafluoropropane) HF water two or more types selected from the above |
| HCFO-1233zd(Z) (Z-1-chloro-3,3,3-triflucropropene) | HCFC-244fa (1-chloro-1,3,3,3-tetrafluoropropane) HCFO-1335mzz (1-chloro-1,1,4,4,4-pentafluoro2-butene) HF water two or more types selected from the above |
| HFC-245fa(Z) (1,1,1,3,3-pentafluoropropane) | HCFO-1333zd(E) (E-1-chloro-3,3,3-trifluoropropene) HF water two or more types selected from the above |

TABLE 2

| (hydro)halocarbon | Composition exhibiting azeotropic-like behavior with (hydro)halocarbon |
|---|---|
| HFO-1234ze(Z) (Z-1,3,3,3-tetrafluoropropene) | HFC-245fa (1,1,1,3,3-pentafluoropropane) HF water two or more types selected from the above |
| HFO-1234ze(E) (E-1,3,3,3-tetrafluoropropene) | trifluoropropene isomer (HFO-1243 isomer) HF water two or more types selected from the above |
| HCFO-1223xd(Z) (Z-1,2-dichloro-3,3,3-trifluoropropene) | HCFO1223xd(E) (E-1,2-dichloro-3,3,3-trifluoropropene) HCFO-1223za (1,1-dichloro-3,3,3-trifluoropropene) HP water two or more types selected fromthe above |
| HCFO-1233yd(Z) (Z-1-chloro-2,3,3-trifluoro-1-propene) | HCFO-1233yd(E) N(E-1-chloro-2,3,3-triflucro-1-propene) HF water two or more types selected from the above |
| HCFO-1232xd(Z) (Z-1,2-dichloro-3,3-difluoropropene) | HCFO 1232xd(E) (E-1,2-dichloro-3,3-difluoropropene) HF water two or more types selected from the above |
| One selected from HCFOs | HF and/or water l mixture of HF and/or water and HCFOs (except for l HCFOs selected on the left) and/or HFOs |
| One selected from HFOs | HF and/or wateri mixture of HF and/or water and HCFOs and/or HFOs (except for HFOs selected on the left) |

In addition, in an embodiment, the (hydro)halocarbon included in a composition and separable from the composition by reduced-pressure distillation includes a compound represented by the general formula (2): $C_nH_dFeCl_fO_g$. In the general formula (2), n is an integer from 3 to 5, d, e, and f are integers greater than or equal to 0, g is an integer greater than or equal to 1, satisfying e+f≥1, and d+e+f=2n−2, 2n, or 2n+2.

A combination of a (hydro)halocarbon represented by the general formula (2) and a compound exhibiting an azeotropic or azeotropic-like behavior with the (hydro)halocarbon at atmospheric pressure and different from the (hydro)halocarbon is shown in Table 3. However, the (hydro)halocarbon and the compound different from the (hydro)halocarbon are not limited thereto.

TABLE 3

| (hydro)halocarbon | Composition exhibiting azeotropic-like behavior with (hydro)halocarbon |
|---|---|
| HFE-356mmz (1,1,1,3,3,3-hexafluoro-2-methoxypropane) | HFIP (1,1,1,3,3,3-hexaflucroisopropanol) HF water two or more types selected from the above |
| (S)1,1,1-trifluoro-2-propanol | water |

EXAMPLES

Hereinafter, examples according to the above-described embodiments will be described. However, embodiments of the present invention are not limited by the following examples. In the following examples, composition of an organic substance was determined by an area of a chromatogram obtained by gas chromatography equipped with an FID detector, unless otherwise noted.

Compositions having a composition shown in Table 4 below was distilled under distillation conditions shown in Table 5. In the distillation, a 2 L flask was used as a distillation still, and a theoretical plate number of the distillation column was set to 40.

TABLE 4

| | composition | | | | |
|---|---|---|---|---|---|
| | Low boilng point substance (LB) | | High boilng point substance (HB) | | Low boiling point substance purity [%] (LB/(LB + HB)) × 100 |
| | Compound name | GC % | Compound name | GC % | |
| Example 1 | 1233zd(Z) | 32.2307 | 244fa | 9.9282 | 75.28 |
| Comparative example 1 | | | | | |
| Example 2 | 245fa | 68.6084 | 1233zd(E) | 31.3879 | 68.61 |
| Comparative Example 2 | | | | | |
| Example 3 | 1223xd(Z) | 98.8903 | 1223za | 1.0676 | 98.93 |
| Example 4 Comparative example 3 | | | | | |
| Example 5 | 1232xd(E) | 11.3672 | 1232xd(Z) | 88.5971 | 11.37 |
| Comparative example 4 | | 10.5892 | | 76.4648 | 12.16 |

TABLE 5

| | Distillation conditions | | |
|---|---|---|---|
| | Still temperature (° C.) | Column top temperature (° C.) | Colum a top pressure (Kpa) |
| Example 1 | 15.8 | −7.9 | 9 |
| Comparative exam pie 1 | 72.7 | 38.9 | 102 |
| Exampie 2 | −12.8 | −7.7 | 29 |
| Comparative exam pie 2 | 14.3 | 14.7 | 102 |
| Example 3 | 11 | −0.4 | 8 |
| Example 4 | −5.6 | −8.0 | 5 |
| Comparative example 3 | 54.5 | 54.1 | 102 |
| Example 5 | 20.9 | 19.7 | 5 |
| Comparative exam pie 4 | 99.2 | 90.0 | 102 |

Compositions of a recovered material after distillation of the compositions of Examples 1 to 5 and Comparative Examples 1 to 4 shown in Table 4 under the conditions shown in Table 5 are shown in Table 6 below. In Table 6 below, Examples 1, 3, and 4 and Comparative Examples 1, 3, and 4 refer to the compositions of the recovered material distilled from the top of the distillation column, and Examples 2 and 5 and Comparative Example 2 refer to the compositions of the remaining composition of the still.

TABLE 6

| | Recovered composition | | | | |
|---|---|---|---|---|---|
| | Low bolling point substance (LB) | | High boiling point substance (HB) | | |
| | Compound name | GC % | Compound name | GC % | Low bolling point substance purity [%] (LB/(LB + HB)) × 100 |
| Example 1 | 1233zd(Z) | 95.0021 | 244fa | 4,4752 | 95.50 |
| Comparative Example 1 | | 83.0913 | | 16.3155 | 83.59 |
| example 2 | 245fa | 60.0371 | 1233zd(E) | 39.9605 | 60.04 |
| Comparative Example 2 | | 68.3710 | | 31.6213 | 68.38 |
| Example 3 | 1223xd(Z) | 99.8226 | 1223za | 0.1315 | 99.87 |
| Example 4 | | 99.9096 | | 0.0608 | 99.94 |
| Comparative example 3 | | 99.6627 | | 0.2325 | 99./77 |
| Example 5 | 1232xd(E) | 0.9482 | 1232xd(Z) | 99.0089 | 0.95 |
| Comparative example 4 | | 10.7009 | | 89.2733 | 10.70 |

Referring to Table 6, when comparing Example 1 and Comparative Example 1, by reduced-pressure distillation, 1233zd(Z) (low boiling point substance) was recovered with higher purity than in the distillation at atmospheric pressure. When comparing Example 2 and Comparative Example 2, by reduced-pressure distillation, 1233zd(E) (high boiling point substance) was recovered with higher purity than in the distillation at atmospheric pressure. When comparing Examples 3, 4 and Comparative Example 3, by reduced-pressure distillation, 1223xd(Z) was recovered with higher purity than in the distillation at atmospheric pressure. In addition, when referring to Example 3 and Example 4, 1223xd(Z) (low boiling point substance) was recovered with higher purity in Example 4 that the column top temperature was set to be lower and the column top pressure was set to be lower during distillation than in Example 3. In addition, when comparing Example 5 and Comparative Example 4, by reduced-pressure distillation, 1232xd(Z) (high boiling point substance) was recovered with higher purity than in the distillation at atmospheric pressure.

Example 5: Purification of High-Purity 1233zd by Multi-Stage Reduced-Pressure Distillation A composition having composition shown in the upper part in Table 7 shown below (in Table 7, referred to as "preparation composition") was charged into a distillation column having a theoretical plate number of 40 plates, reduced-pressure distillation was performed at a distillation pressure of 8 to 10 kPa, and a composition having composition shown in the lower part in Table 7 (in Table 7, referred to as "main fraction") was recovered.

1208.23 g of the above main fraction was charged into the distillation column having a theoretical plate number of 40, and distillation was performed. As shown in Table 8, fraction 1 was recovered by atmospheric distillation at a distillation pressure of 101 kPa, and then reduced-pressure distillation was performed at a distillation pressure of 8 to 9 kPa to recover fractions 2 to 10. From the fractions recovered by reduced-pressure distillation, 829.13 g of high-purity 1233zd(Z) in which 244fa content is 3% or less (fractions 2 to 9) can be obtained, and 749.95 g of high-purity 1233zd(Z) in which 244fa content is 1% or less (fractions 2 to 7) can be obtained, and 639.06 g of high-purity 1233zd(Z) in which 244fa content is 0.5% or less (fractions 2 to 6) can be obtained, and 129.44 g of high-purity 1233zd(Z) in which 244fa content is 0.3% or less (fraction 4) can be obtained. In this case, the fractions 2 to 10 are fractions in the order of timing taken out from the distillation column.

In addition, 204.68 g of high-purity 244fa having a content of 1% or less of 1233zd(Z) was obtained from a distillation residue.

TABLE 7

|  | Weight [g] | Low boiling (LB) 1233zd(Z) [GC %] | High boiling (HB) 244fa [GC %] | Low boiling purity [%] (LB/(LB + HB)) × 100 | High boiling purity [%] (HB/(LB + HB)) × 100 |
|---|---|---|---|---|---|
| Preparation composition | 3986.3 | 30.231 | 9.928 | 75.28 | 24.72 |
| Main fraction | 1304.0 | 80.401 | 18.660 | 81.16 | 18.84 |

TABLE 8

|  | Column top pressure [kPa] | Column top temperature [° C.] | Weight [g] | Low boiling (LB) 1233zd(Z) [GC %] | High boiling (HB) 244fa [GC %] | Low boiling purity [%] (LB/(LB + HB)) × 100 | High boiling purity [%] (HB/(LB + HB)) × 100 |
|---|---|---|---|---|---|---|---|
| Preparation |  |  | 1208.23 | 80.4014 | 18.6602 | 81.16 | 18.84 |
| Fraction 1 | 101 | 38.9 | 55.27 | 86.3141 | 4.2289 | 95.33 | 4.67 |
| Fraction 2 | 9 | −9.1 | 147.81 | 99.1539 | 0.3446 | 99.65 | 0.35 |
| Fraction 3 | 8 | −10.2 | 121.38 | 99.3566 | 0.4368 | 99.56 | 0.44 |
| Fraction 4 | 8 | −11.3 | 129.44 | 99.5808 | 0.2530 | 99.75 | 0.25 |
| Fraction 5 | 8.5 | −9.5 | 118.7 | 99.5894 | 0.3682 | 99.63 | 0.37 |
| Fraction 6 | 8.5 | −9.4 | 121.73 | 99.5106 | 0.4550 | 99.54 | 0.46 |
| Fraction 7 | 8 | −9.8 | 110.89 | 99.2990 | 0.6727 | 99.33 | 0.67 |
| Fraction 8 | 8.5 | −9.7 | 9.89 | 96.3448 | 2.5513 | 97.42 | 2.58 |
| Fraction 9 | 9 | −9 | 69.29 | 97.4315 | 2.4859 | 97.51 | 2.49 |
| Fraction 10 | 8.5 | −6.8 | 60.13 | 52.4999 | 47.2289 | 52.64 | 47.36 |
| Distillation residue |  |  | 204.68 | 0.3275 | 97.5538 | 0.33 | 99.67 |

From the above Examples and Comparative Examples, it can be seen that, by purifying a compound exhibiting an azeotropic or azeotropic-like behavior with each other in the composition by reduced-pressure distillation, each component in the composition is obtained with higher purity than atmospheric distillation.

What is claimed is:

1. A method for producing a (hydro)halocarbon comprising:
    a step of purifying a (hydro)halocarbon by reduced-pressure distillation of an azeotropic or azeotropic-like composition containing the (hydro)halocarbon and a compound different from the (hydro)halocarbon, wherein:
    the (hydro)halocarbon is cis-1-chloro-3,3,3-trifluoropropene and the compound different from the (hydro) halocarbon is 3-chloro-1,1,1,3-tetrafluoropropane, or
    the (hydro)halocarbon is cis-1,2-dichloro-3,3,3-trifluoropropene and the compound different from the (hydro) halocarbon includes at least one of 1,1-dichloro-3,3,3-trifluoropropene and trans-1,2-dichloro-3,3,3-trifluoropropene, or
    the (hydro)halocarbon is cis-1,2-dichloro-3,3-difluoropropene and the compound different from the (hydro) halocarbon includes at least one of trans-1,2-dichloro-3,3-difluoropropene, hydrogen fluoride, and water, or
    the (hydro)halocarbon is trans-1-chloro-3,3,3-trifluoropropene and the compound different from the (hydro) halocarbon includes at least one of 1,1,1,3,3-pentafluoropropane, 2-chloro-3,3,3-trifluoropropene, cis-1-chloro-1,3,3,3-tetrafluoropropene, 2-chloro-1,3,3,3-tetrafluoropropene, hydrogen fluoride, and water, or
    the (hydro)halocarbon is cis-1-chloro-2,3,3-trifluoro-1-propene and the compound different from the (hydro) halocarbon includes at least one of trans-1-chloro-2,3,3-trifluoro-1-propene, hydrogen fluoride, and water, and
    wherein the reduced-pressure distillation is performed using a distillation column with a column top pressure of 50 kPa or less.

2. A method for producing cis-1-chloro-3,3,3-trifluoropropene comprising:
    a step of recovering a fraction containing cis-1-chloro-3,3,3-trifluoropropene as a major component by reduced-pressure distillation of an azeotropic or azeotropic-like composition containing cis-1-chloro-3,3,3-trifluoropropene and saturated hydrohalocarbon containing at least 3-chloro-1,1,1,3-tetrafluoropropane; and
    a step of obtaining cis-1-chloro-3,3,3-trifluoropropene with a content of 3% by mass or less of 3-chloro-1,1,1,3-tetrafluoropropane by further reduced-pressure distillation of the fraction, wherein the reduced-pressure distillation is performed using a distillation column with a column top pressure of 50 kPa or less.

3. The method for producing cis-1-chloro-3,3,3-trifluoropropene according to claim 2, further comprising a step of purifying cis-1-chloro-3,3,3-trifluoropropene by contacting the fraction with a base after the step of recovering the fraction and before the step of obtaining cis-1-chloro-3,3,3-trifluoropropene.

4. The method for producing cis-1-chloro-3,3,3-trifluoropropene according to claim 3, wherein the step of purifying cis-1-chloro-3,3,3-trifluoropropene is a step of dehydrohalogenation of 3-chloro-1,1,1,3-tetrafluoropropane contained in the fraction.

5. The method for producing cis-1-chloro-3,3,3-trifluoropropene according to claim 3, wherein the base is at least one selected from the group consisting of hydroxides, carbonates, phosphates, alkoxides, oxides, and hydrides of alkali metals or alkaline earth metals.

6. A method for producing cis-1,2-dichloro-3,3,3-trifluoropropene comprising:
  a step of recovering a fraction containing cis-1,2-dichloro-3,3,3-trifluoropropene as a major component by reduced-pressure distillation of an azeotropic or azeotropic-like composition containing cis-1,2-dichloro-3,3,3-trifluoropropene and at least one of trans-1,2-dichloro-3,3,3-trifluoropropene and 1,1-dichloro-3,3,3-trifluoropropene; and
  a step of obtaining cis-1,2-dichloro-3,3,3-trifluoropropene with content of 3% by mass or less of at least one of trans-1,2-dichloro-3,3,3-trifluoropropene and 1,1-dichloro-3,3,3-trifluoropropene by further reduced-pressure distillation of the fraction,
  wherein the reduced-pressure distillation is performed using a distillation column with a column top pressure of 50 kPa or less.

7. The method for producing cis-1,2-dichloro-3,3,3-trifluoropropene according to claim 6, further comprising a step of purifying cis-1,2-dichloro-3,3,3-trifluoropropene by contacting the fraction with a base after the step of recovering the fraction and before the step of obtaining cis-1,2-dichloro-3,3,3-trifluoropropene.

8. The method for producing cis-1,2-dichloro-3,3,3-trifluoropropene according to claim 7, wherein the step of purifying cis-1,2-dichloro-3,3,3-trifluoropropene is a step of dehydrohalogenation of at least one of trans-1,2-dichloro-3,3,3-trifluoropropene and 1,1-dichloro-3,3,3-trifluoropropene contained in the fraction.

9. The method for producing cis-1,2-dichloro-3,3,3-trifluoropropene according to claim 7, wherein the base is at least one selected from the group consisting of hydroxides, carbonates, phosphates, alkoxides, oxides, and hydrides of alkali metals or alkaline earth metals.

\* \* \* \* \*